(12) United States Patent
Turnau, III et al.

(10) Patent No.: US 10,443,743 B2
(45) Date of Patent: Oct. 15, 2019

(54) ROTARY PLUG VALVE

(71) Applicant: BrassCraft Manufacturing Company, Novi, MI (US)

(72) Inventors: William F. Turnau, III, Canton, MI (US); Joseph P. Schutte, Ann Arbor, MI (US); Robert J. Theriaque, Somers, CT (US); John G. Moutafis, Longmeadow, MA (US); Victor J. Morando, Chicopee, MA (US)

(73) Assignee: BrassCraft Manufacturing Company, Novi, MI (US)

( * ) Notice: Subject to any disclaimer, the term of this patent is extended or adjusted under 35 U.S.C. 154(b) by 0 days.

(21) Appl. No.: 15/812,360

(22) Filed: Nov. 14, 2017

(65) Prior Publication Data
US 2019/0145529 A1    May 16, 2019

(51) Int. Cl.
*F16K 5/04*    (2006.01)

(52) U.S. Cl.
CPC ............ *F16K 5/0442* (2013.01); *F16K 5/045* (2013.01); *F16K 5/0407* (2013.01); *F16K 5/0414* (2013.01)

(58) Field of Classification Search
CPC .... F16K 5/0442; F16K 5/0407; F16K 5/0414; F16K 5/045
See application file for complete search history.

(56) References Cited

U.S. PATENT DOCUMENTS

| | | | | |
|---|---|---|---|---|
| 3,012,752 A | * | 12/1961 | Buck | F16K 5/0414 137/625.41 |
| 3,103,948 A | * | 9/1963 | Hubert | F16K 5/045 137/375 |
| 3,314,644 A | * | 4/1967 | Dwyer | B29C 45/1418 251/309 |
| 3,353,785 A | * | 11/1967 | Eggers | F16K 5/045 251/175 |
| 3,916,943 A | | 11/1975 | Hester et al. | |
| 4,275,868 A | * | 6/1981 | Crone | F16K 5/045 251/310 |
| 4,511,120 A | * | 4/1985 | Conley | F16K 27/065 251/288 |
| 4,609,177 A | * | 9/1986 | Turner | F16K 27/065 251/175 |
| 4,699,358 A | * | 10/1987 | Iqbal | F16K 5/0407 251/117 |
| 4,700,928 A | * | 10/1987 | Marty | F16K 5/0414 137/454.6 |
| 4,778,152 A | | 10/1988 | Logman | |
| 4,791,962 A | * | 12/1988 | Moen | F16K 5/0414 137/625.17 |
| 4,988,077 A | * | 1/1991 | Conley | F16K 5/045 251/309 |

(Continued)

*Primary Examiner* — Reinaldo Sanchez-Medina
*Assistant Examiner* — David Colon-Morales
(74) *Attorney, Agent, or Firm* — Reising Ethington P.C.

(57) ABSTRACT

A plug valve assembly includes a valve carried in a valve body and including a spindle coupled to a plug. The spindle may have an appendage coupled to a sidewall of the plug, and circumferentially extending about a rotational axis less than 180 angular degrees, such that the spindle appendage is registrable with a valve body outlet to selectively reinforce the plug sidewall and thereby resist blowout of the plug sidewall into or through the valve body outlet. The spindle may be composed of nylon and the plug may be composed of liquid silicone rubber.

26 Claims, 2 Drawing Sheets

(56) References Cited

U.S. PATENT DOCUMENTS

| | | | | |
|---|---|---|---|---|
| 5,076,540 | A * | 12/1991 | Murphy | F16K 5/0414 |
| | | | | 137/315.25 |
| 5,149,054 | A * | 9/1992 | Passerell | F16K 5/045 |
| | | | | 251/309 |
| 5,154,396 | A | 10/1992 | Conley et al. | |
| 5,695,169 | A * | 12/1997 | Higgins | F16K 5/0414 |
| | | | | 16/441 |
| 5,950,664 | A * | 9/1999 | Battaglia | F16K 5/0414 |
| | | | | 137/375 |
| 6,655,658 | B2 | 12/2003 | Neal et al. | |
| 6,737,000 | B2 * | 5/2004 | Hagel | B05C 17/002 |
| | | | | 156/94 |
| 7,036,793 | B2 | 5/2006 | Turnau, III et al. | |
| 7,178,786 | B2 | 2/2007 | Turnau, III et al. | |
| 8,146,888 | B1 | 4/2012 | Hoeptner | |
| 8,556,873 | B2 * | 10/2013 | Bjerregaard | A61F 5/4405 |
| | | | | 604/327 |
| D776,793 | S | 1/2017 | Vaseleniuck et al. | |
| 2003/0155385 | A1 | 8/2003 | Sohoel et al. | |
| 2006/0202149 | A1 | 9/2006 | Muddiman | |
| 2006/0208213 | A1 | 9/2006 | Turnau, III et al. | |
| 2009/0058082 | A1 * | 3/2009 | Green | E03C 1/021 |
| | | | | 285/222.1 |
| 2011/0233437 | A1 | 9/2011 | Mattson et al. | |
| 2016/0033050 | A1 * | 2/2016 | Ferrer Beltran | F16K 11/085 |
| | | | | 137/625.46 |
| 2016/0116076 | A1 * | 4/2016 | Fatherazi | F16K 31/5286 |
| | | | | 251/215 |

* cited by examiner

ROTARY PLUG VALVE

TECHNICAL FIELD

This disclosure relates generally to valves and, more particularly, to rotary plug valve assemblies and valves for such assemblies.

BACKGROUND

Plug valve assemblies typically include a valve body including an inlet, an outlet, a valve channel between the inlet and the outlet, and a valve port, and also including a plug carried in the valve body and having an inlet and an outlet. The plug is rotatable in the valve body, between an open position such that the plug outlet is in fluid communication with the valve body outlet to permit fluid flow through the valve, and a closed position such that the plug outlet is out of fluid communication with the valve body outlet to prevent fluid flow through the valve. But some plug configurations and/or plug materials are not ideal for some applications, for example, where plug valve assemblies are exposed to high fluid pressure conditions and/or high heat when the valve body is soldered to upstream or downstream plumbing conduit.

BRIEF SUMMARY

A first illustrative embodiment of a plug valve assembly includes a valve carried in a valve body. The valve body includes an inlet, an outlet, a valve channel between the inlet and the outlet, and a valve port. The valve includes a spindle coupled to a plug. The plug has a coupling end, a free end, and a sidewall extending between the coupling end and the free end to at least partially establish a plug channel. The sidewall has a plug outlet in communication with the plug channel. The spindle has a base carried between the valve channel and the valve port and a stem extending from the base through the valve port to facilitate manipulation of the plug within the valve body. The valve is selectively rotatable about the axis in the valve body, between an open position such that the plug outlet is in fluid communication with the valve body outlet to permit fluid flow through the valve, and a closed position such that the plug outlet is out of fluid communication with the valve body outlet to prevent fluid flow through the valve. In a first implementation, the spindle has an appendage that is coupled to the plug sidewall, longitudinally extends in a direction away from the base and into the valve channel, and circumferentially extends about the axis less than 180 angular degrees, such that the spindle appendage registers with the valve body outlet to selectively reinforce the plug sidewall and thereby resist blowout of the plug sidewall into or through the valve body outlet. In a second implementation, the spindle is composed of nylon and the plug is composed of liquid silicone rubber.

In accordance with another illustrative embodiment, there is provided a valve for a plug valve assembly. The valve includes a nylon spindle molded to a liquid silicone rubber plug. The plug has a coupling end, a free end, and a sidewall extending between the coupling end and the free end to at least partially establish a plug channel, and having a plug outlet in communication with the plug channel. The nylon spindle has a base, and a stem extending from the base to facilitate manipulation of the plug. The nylon spindle also has an appendage that is coupled to the plug sidewall, longitudinally extends in a direction away from the base, and circumferentially extends about the axis less than 180 angular degrees to circumferentially selectively reinforce the plug sidewall and thereby resist blowout of the plug sidewall.

DETAILED DESCRIPTION

In general, a plug valve will be described using one or more examples of illustrative embodiments of a rotary plug valve assembly. As will be described in greater detail below, the plug valve includes a novel arrangement of improved valve construction and/or valve materials for improved performance of the valve assembly. For example, the valve may include a liquid silicone rubber plug and a nylon spindle coupled to the plug, and the spindle may include an appendage to selectively reinforce the plug and thereby resist blowout of the plug. The example embodiments will be described with reference to use with an assembly of right-angled, cylindrical construction. However, it will be appreciated as the description proceeds that the invention is useful in many different applications and may be implemented in many other embodiments including, but not limited to, an assembly of straight, conical construction, spherical construction, or any other suitable geometry.

Figure 1:
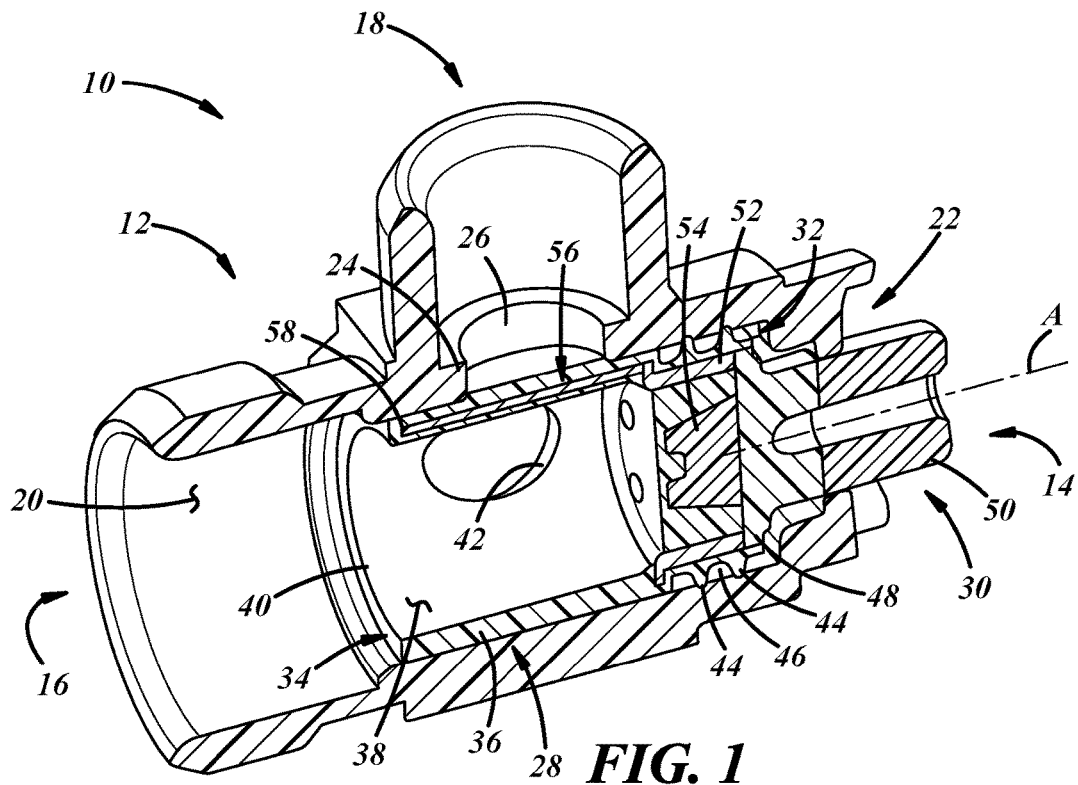
FIG. 1 is a perspective cross-sectional view according to an illustrative embodiment of a plug valve assembly including a plug valve carried in a valve body.

Referring specifically to the drawings, FIG. 1 illustrates an illustrative embodiment of a plug valve assembly 10 including a valve body 12, and a valve 14 carried in the valve body 12. The example embodiment illustrated in FIG. 1 is of right-angled, cylindrical construction wherein fluid flows in both an axial and radial direction through the valve 14, but those of ordinary skill in the art would recognize that any other orientations and shapes of the plug valve assembly 10 are contemplated by the scope of the present disclosure and claims, including, but not limited to straight pass-through designs wherein fluid flows predominantly in a radial direction through a valve.

With reference to FIG. 1, the valve body 12 includes an inlet 16, an outlet 18, a valve channel 20 between the inlet 16 and the outlet 18, and a valve port 22. In the illustrated example, the valve body 12 has a longitudinal axis A extending between the inlet 16 and the valve port 22, and the outlet 18 is transversely disposed with respect to the inlet 16 and the valve port 22. As used herein, the terminology "transversely disposed" may include perpendicularly disposed, as exemplified in FIG. 1, or acutely, obtusely, or otherwise obliquely disposed at any suitable angle with respect to the axis A. The valve body 12 includes any suitable walls, bosses, and/or other housing structure to carry the valve 14 therein. In particular, the valve body 12 may include a valve seal wall 24 having an outlet aperture 26 extending therethrough in communication with the valve body outlet 18 and being overlapped by a portion of the valve 14.

Figure 2:
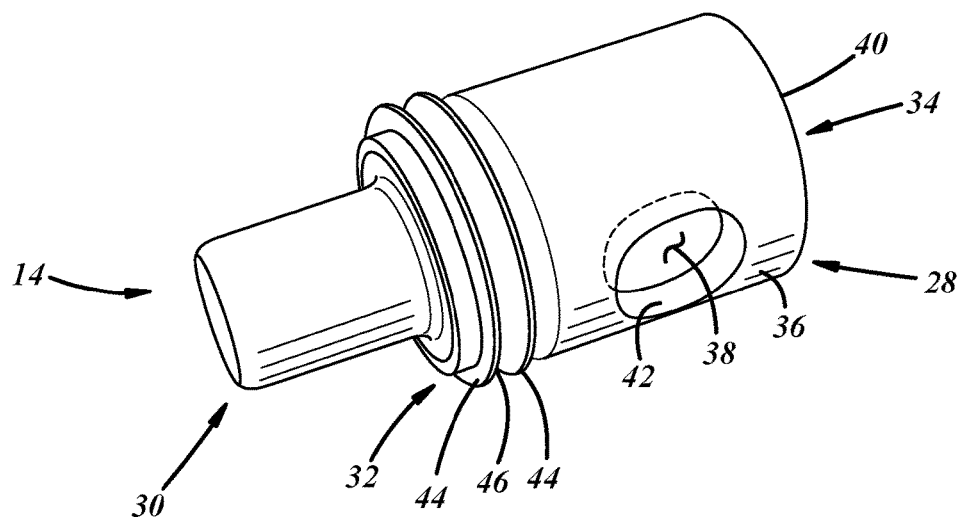
FIG. 2 is a perspective view of the plug valve of FIG. 1 and including a plug coupled to a spindle.

With reference to FIGS. 1 and 2, the valve 14 includes a plug 28 and a spindle 30 coupled together and the valve 14 is rotatable about the axis A (FIG. 1). The plug 28 has a coupling end 32, a free end 34, and a sidewall 36 extending between the coupling end 32 and the free end 34 to at least partially establish a plug channel 38. In the illustrated embodiment, the free end 34 of the plug 28 is open to establish a plug inlet 40 in communication with the plug channel 38, and the sidewall 36 has a plug outlet 42 in communication with the plug channel 38. In the illustrated embodiment, the plug outlet 42 is round but may be oval, square, slit, or of any other suitable shape in other embodiments. Also in the illustrated embodiment, the plug sidewall 36 is of hollow cylindrical shape and may include one or more sealing rings 44 and grooves therebetween 46 proximate the coupling end 32 for sealing against a corresponding internal sealing surface of the valve body 12 (FIG. 1). The spindle 30 may be coupled to the coupling end 32 of the plug 28.

Figure 3:
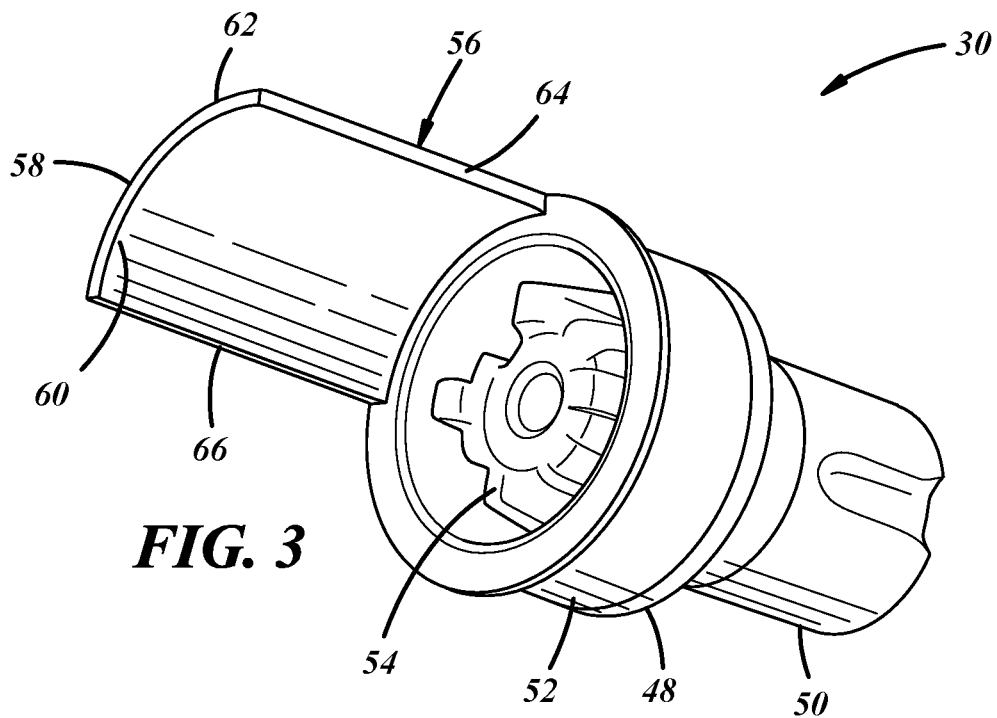
FIG. 3 is a perspective view of the spindle of FIG. 2.

With reference to FIGS. 1 and 3, the spindle 30 includes a base 48 carried between the valve channel 20 and the valve port 22 (FIG. 1). Also, the spindle 30 includes a stem 50 extending from the base 48 through the valve port 22 to facilitate manipulation of the plug 28 within the valve body 12 (FIG. 1). In the illustrated embodiment, the base 48 includes a flange of greater diameter than the stem 50. In other embodiments, the base 48 simply may include a rearward end of the stem 50. The stem 50 may include a shaft that may be splined, keyed, flatted, or otherwise provided with a means for positive circumferential coupling to a handle, lever, or the like (not shown).

In the illustrated embodiment, the spindle 30 also includes a plug coupling skirt 52 and a plug coupling hub 54 extending from the base 48 in a direction opposite that of the stem 50. The plug coupling skirt 52 may extend from a radially outermost portion of the base 48, and the plug coupling hub 54 may be disposed radially inwardly of the skirt 52. The hub 54 may be fluted, toothed, serrated, or otherwise provided with a means for interengaging the material of the plug 28.

Additionally, the spindle 30 includes an appendage 56 coupled to the plug sidewall 36, longitudinally extending in a direction away from the spindle base 48 into the valve channel 20, and circumferentially extending about the axis A less than 180 angular degrees (FIG. 1). More specifically, the appendage 56 may be oriented and spaced about 90 angular degrees from the plug outlet 42 and may extend circumferentially less than 120 angular degrees about the axis A. Even more particularly, the appendage 56 may extend circumferentially less than 90 angular degrees about the axis A (FIG. 1). Also, the appendage 56 may extend longitudinally past the sidewall plug outlet 42 (FIG. 1). Preferably, however, the appendage 56 is axially shorter than the plug sidewall 36 such that a free end 58 of the appendage 56 stops short of the free end 34 of the plug 28 (FIG. 1). In the illustrated embodiment, the appendage 56 is entirely encapsulated in the plug sidewall 36 (FIG. 1). For example, the appendage 56 may have radially inner and outer surfaces 60, 62 (FIG. 3) and circumferential edges 64, 66 (FIG. 3) that are surrounded by material of the plug 28. In other embodiments, the appendage 56 may be partially encapsulated in the plug sidewall 56, or may be disposed radially inwardly of the plug sidewall 56 such that the outer surface 62 of the appendage 56 is coupled to a corresponding inner surface of the plug sidewall 56. Also, in the illustrated embodiment, the appendage 56 may extend from a free end of the plug coupling skirt 52. But in other embodiments that may not include the skirt 52, the appendage 56 may extend directly from the spindle base 48. In the illustrated embodiment, the appendage 56 is cantilevered, and conforms to the shape of the plug 28, for example, in the form of a tab or wing of semi-cylindrical shape.

Although not shown in FIG. 3, the valve may include the spindle 30 with a plurality of the appendage 56, for example, multiple, equidistantly circumferentially spaced, identical instances of the appendage 56, or multiple such appendages that may not be equidistantly circumferentially spaced from one another, or multiple differently shaped and/or sized such appendages, or any combination of the aforementioned embodiments.

Figure 4:
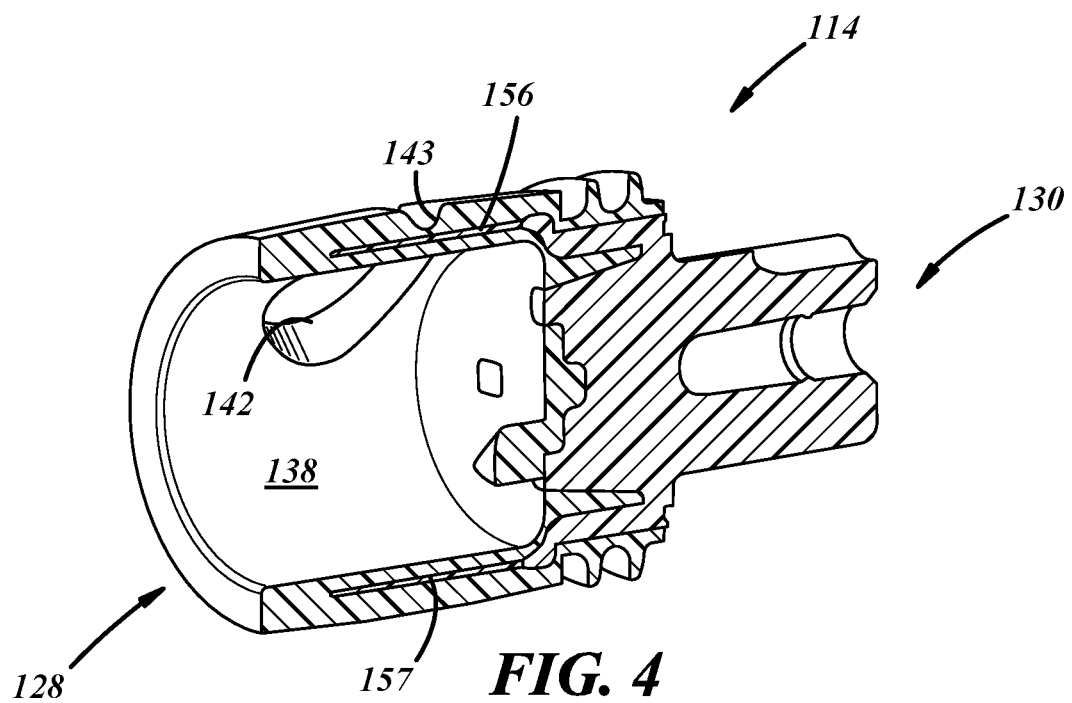
FIG. 4 is a cross-sectional perspective view according to an illustrative embodiment of a plug valve.

In a specific example of such a configuration, FIG. 4 illustrates another illustrative embodiment of a valve 114. This embodiment is similar in many respects to the embodiment of FIGS. 1-3 and like numerals between the embodiments generally designate like or corresponding elements throughout the several views of the drawing figures. Accordingly, the descriptions of the embodiments are hereby incorporated into one another, and description of subject matter common to the embodiments generally may not be repeated. The valve 114 includes a plug 128 and a spindle 130 coupled together, wherein the spindle 130 includes a plurality of appendages 156, 157 that are diametrically opposed. Such a valve design may be particularly suitable for dual-ported valve assemblies, straight flow through valve assemblies, and the like. Additionally, the plug 128 may include a bypass relief 143 in an outer surface of the plug 128. The relief 143 may include a groove in communication with a plug aperture 142, or another, smaller aperture, to allow fluid to enter a plug channel 138 when the plug 128 is in a closed position, to provide continuous fluid pressure on the sidewall of the plug 128 to assist with plug sealing in the closed position. Such a feature may be particularly suitable for straight flow through valve assemblies where pressure-assist sealing is desirable.

With reference to FIG. 1, the valve 14 is selectively rotatable about the axis A in the valve body 12, between an open position and a closed position. In the closed position, as illustrated, the plug outlet 42 is out of fluid communication with the valve body outlet 18 to prevent fluid flow through the valve 14, and such that the spindle appendage 56 registers with the valve body outlet 18 to selectively reinforce the plug sidewall 36 and thereby resist blowout of the plug sidewall 36 into or through the valve body outlet 18. In the open position (not shown), the plug outlet 42 is in fluid communication with the valve body outlet 18 to permit fluid flow through the valve 14. In the illustrated embodiment, the appendage 56 completely overlaps or eclipses the outlet aperture 26. In other embodiments, the appendage 56 may overlap the outlet aperture 26 to a lesser extent, but preferably greater than 50% of the cross-sectional area of the outlet aperture 26. During development of the embodiment illustrated in FIGS. 1-3, it was discovered that the presently disclosed valve assembly can withstand fluid pressure in excess of 1000 psi.

Any suitable materials can be used in making the components, such as metals, composites, polymeric materials, and other materials suitable for use in plug valve assemblies. In a specific example, the spindle 30 and the plug 28 are composed of polymeric materials. More particularly, the spindle 30 is composed of a thermoplastic material and the plug 28 is composed of an elastomeric material. Even more specifically, the spindle 30 may be composed of nylon, for instance, a glass reinforced nylon resin, and the plug 28 may be composed of liquid silicone rubber, for instance, a self-bonding/self-adhesive grade resin that adheres to various polymeric substrates.

In general, the plug valve assembly 10 can be assembled according to known techniques, and the components of the plug valve assembly 10 can be manufactured according to techniques known to those skilled in the art, including molding, casting, forging, machining, stamping, welding, brazing, and the like.

In a specific example, the valve 14 may be a molded component wherein the plug 28 may be co-molded (or co-injection molded) with the spindle 30, or over-molded (or insert-molded) onto the spindle 30, or the valve 14 may be molded according to any other suitable molding methods. According to an example insert-molding process, the spindle 30 is pre-formed and the plug 28 is formed thereover. In fact, it is generally preferable to overmold the polymeric material of the plug 28 to the pre-formed spindle 30 before the polymeric material of the spindle 30 has completely cooled. This process avoids the need to manually mount, paste, or use an adhesive to adhere the plug 28 to the spindle 30. In any case, the preformed spindle 28 may be either manually or robotically assembled onto a specific predetermined location on a core pin of an injection molding machine (not shown). Mold halves of the injection molding machine close around the core pin. Molten plastic is injected into a mold cavity that is defined by the closed mold halves, the core pin, and the spindle 30, wherein the molten polymeric material forms the plug 28 in the shape of the mold cavity. After molding, the mold halves separate or open and the core pin retracts, leaving the plug 28 intact with the spindle 30 to create the valve 14, which may then be subjected to any desired finish operations, for example, deburring or deflashing and, thereafter, may be ready for assembly into the valve body 12.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Therefore, the claimed invention is not limited to the particular examples of illustrative embodiments disclosed herein but, instead, is defined by the accompanying claims.

The invention claimed is:

1. A plug valve assembly, comprising:
   a valve body including an inlet, an outlet, a valve channel between the inlet and the outlet, and a valve port; and
   a valve carried in the valve body, and including:
      a plug having:
         a coupling end;
         a free end; and
         a sidewall extending between the coupling end and the free end to at least partially establish a plug channel, and having a plug outlet in communication with the plug channel; and
      a spindle coupled to the plug and having:
         a base carried between the valve channel and the valve port;
         a stem extending from the base through the valve port to facilitate manipulation of the plug within the valve body; and
         an appendage coupled to the plug sidewall, longitudinally extending in a direction away from the base into the valve channel, and circumferentially extending about the axis less than 180 angular degrees; and
      wherein the valve is selectively rotatable about the axis in the valve body, between:
         an open position such that the plug outlet is in fluid communication with the valve body outlet to permit fluid flow through the valve, and
         a closed position such that the plug outlet is out of fluid communication with the valve body outlet to prevent fluid flow through the valve, and such that the spindle appendage registers with the valve body outlet to selectively reinforce the plug sidewall and thereby resist blowout of the plug sidewall into or through the valve body outlet.

2. The plug valve assembly of claim 1, wherein the spindle also includes a plug coupling skirt extending away from the base, wherein the appendage extends away from a free end of the skirt.

3. The plug valve assembly of claim 2, wherein the spindle further includes a plug coupling hub disposed radially within the skirt.

4. The plug valve assembly of claim 1, wherein the free end of the plug is open to establish a plug inlet in communication with the plug channel.

5. The plug valve assembly of claim 1, wherein the plug is insert molded to the spindle, wherein the spindle is composed of a thermoplastic material and the plug is composed of an elastomeric material.

6. The plug valve assembly of claim 1, wherein the spindle is composed of nylon and the plug is composed of liquid silicone rubber.

7. The plug valve assembly of claim 1, wherein the spindle appendage is oriented about 90 angular degrees from the plug outlet and circumferentially extends less than 120 angular degrees about the axis.

8. The plug valve assembly of claim 1, wherein the spindle appendage is axially shorter than, and encapsulated in, the plug sidewall.

9. The plug valve assembly of claim 1, wherein the spindle stem is a shaft.

10. The plug valve assembly of claim 1, wherein the plug is cylindrical.

11. The plug valve assembly of claim 1, wherein the plug outlet is round.

12. The plug valve assembly of claim 1, wherein the spindle includes a plurality of the appendage.

13. The plug valve assembly of claim 1, wherein the plug sidewall also includes a bypass relief to allow fluid to enter the plug channel when the plug is in the closed position in the assembly to provide continuous fluid pressure on the sidewall of the plug to assist with plug sealing in the closed position.

14. A plug valve assembly, comprising:
a valve body including an inlet, an outlet, a valve channel between the inlet and the outlet, and a valve port; and
a valve carried in the valve body, and including:
a liquid silicone rubber plug having:
a coupling end;
a free end; and
a sidewall extending between the coupling end and the free end to at least partially establish a plug channel, and having a plug outlet in communication with the plug channel; and
a nylon spindle coupled to the liquid silicone rubber plug and having:
a base carried between the valve channel and the valve port;
a stem extending from the base through the valve port to facilitate manipulation of the plug within the valve body; and
an appendage longitudinally extending in a direction away from the base, and circumferentially extending about the axis less than 180 angular degrees to circumferentially selectively reinforce the plug sidewall,
wherein the valve is selectively rotatable in the valve body, between:
an open position such that the plug outlet is in fluid communication with the valve body outlet to permit fluid flow through the valve, and
a closed position such that the plug outlet is out of fluid communication with the valve body outlet to prevent fluid flow through the valve.

15. The plug valve assembly of claim 14, wherein the in the closed position of the plug, the spindle appendage registers with the valve body outlet to resist blowout of the plug sidewall into or through the valve body outlet.

16. The plug valve assembly of claim 14, wherein the spindle appendage is oriented about 90 angular degrees from the plug outlet and circumferentially extends less than 120 angular degrees around the axis.

17. The plug valve assembly of claim 14, wherein the spindle appendage is axially shorter than, and encapsulated in, the plug sidewall.

18. The plug valve assembly of claim 14, wherein the spindle stem is a shaft.

19. The plug valve assembly of claim 14, wherein the plug is cylindrical.

20. The plug valve assembly of claim 14, wherein the plug outlet is round.

21. The plug valve assembly of claim 14, wherein the spindle includes a plurality of the appendage.

22. The plug valve assembly of claim 14, wherein the plug sidewall also includes a bypass relief to allow fluid to enter the plug channel when the plug is in the closed position in the assembly to provide continuous fluid pressure on the sidewall of the plug to assist with plug sealing in the closed position.

23. A valve for a plug valve assembly, comprising:
a liquid silicone rubber plug having:
a coupling end;
a free end; and
a sidewall extending between the coupling end and the free end to at least partially establish a plug channel, and having a plug outlet in communication with the plug channel; and
a nylon spindle molded to the plug and having:
a base;
a stem extending from the base to facilitate manipulation of the plug; and
an appendage coupled to the plug sidewall, longitudinally extending in a direction away from the base, and circumferentially extending about the axis less than 180 angular degrees to circumferentially selectively reinforce the plug sidewall and thereby resist blowout of the plug sidewall.

24. The valve of claim 23, wherein the spindle also includes a plug coupling skirt extending away from the base and a plug coupling hub disposed radially within the skirt, wherein the appendage is cantilevered from the skirt.

25. The valve of claim 23, wherein the spindle includes a plurality of the appendage.

26. The valve of claim 23, wherein the plug sidewall also includes a bypass relief to allow fluid to enter the plug channel.

* * * * *